United States Patent
O

(10) Patent No.: US 7,219,240 B2
(45) Date of Patent: May 15, 2007

(54) MONITOR AND METHOD FOR CONTROLLING POWER-ON AND POWER-OFF OF HOST COMPUTER

(75) Inventor: Chih-Ping O, Taipei (TW)

(73) Assignee: Acer Incorporated, Taipei Hsien (TW)

( * ) Notice: Subject to any disclaimer, the term of this patent is extended or adjusted under 35 U.S.C. 154(b) by 464 days.

(21) Appl. No.: 10/840,312

(22) Filed: May 6, 2004

(65) Prior Publication Data

US 2005/0114716 A1 May 26, 2005

(30) Foreign Application Priority Data

Nov. 21, 2003 (TW) .............................. 92132820 A

(51) Int. Cl.
*G06F 1/26* (2006.01)

(52) U.S. Cl. ...................... 713/300; 713/310; 713/323; 713/324; 710/313; 345/211; 345/212

(58) Field of Classification Search ................ 713/300, 713/320, 323, 324
See application file for complete search history.

(56) References Cited

U.S. PATENT DOCUMENTS

| | | | | |
|---|---|---|---|---|
| 5,764,547 A | * | 6/1998 | Bilich et al. ................ | 713/321 |
| 6,097,379 A | * | 8/2000 | Ichiraku ...................... | 345/213 |
| 6,125,449 A | * | 9/2000 | Taylor et al. ................ | 713/310 |
| 6,304,253 B1 | * | 10/2001 | Sung et al. .................. | 345/418 |
| 6,477,594 B1 | * | 11/2002 | Tung .......................... | 710/104 |
| 6,574,684 B1 | * | 6/2003 | Chu ............................ | 710/30 |
| 7,017,052 B2 | * | 3/2006 | Aklilu et al. ............... | 713/300 |
| 7,062,668 B2 | * | 6/2006 | Kwahk et al. .............. | 713/330 |
| 2003/0107566 A1 | | 6/2003 | Shin et al. | |

* cited by examiner

*Primary Examiner*—A. Elamin
*Assistant Examiner*—Nitin C. Patel

(57) ABSTRACT

A monitor for controlling power-on and power-off of a host computer includes a switch device, a monitoring device and a transmission device. The host computer has a processing device. The switch device is used for changing a status thereof in response to an external force applied thereto. The monitoring device is electrically connected to the switch device for monitoring the change of the status of the switch device, and determines if a power management event is activated by the change of the status of the switch status. The transmission device is electrically connected to the monitoring device, and transmits a power management signal to the host computer according to the determination that the change of the status of the switching device activates a power management event, such that the processing device performs a startup power-on or a power-off operation on the host computer.

17 Claims, 4 Drawing Sheets

MONITOR AND METHOD FOR CONTROLLING POWER-ON AND POWER-OFF OF HOST COMPUTER

FIELD OF THE INVENTION

The present invention relates to a monitor, and more particularly to a monitor for controlling power-on and power-off of a host computer. The present invention also relates to a control method of powering on and powering off the host computer by such monitor.

BACKGROUND OF THE INVENTION

A power management system is widely used to save power consumption in a personal computer system. Advanced Configuration and Power Management Interface (ACPI), which was published by Intel, Microsoft and Toshiba in Dec. 22, 1996, is a specification defining standard interfaces for hardware configuration and power management of a power-saving system. According to the ACPI specification, the function of power management is integrated into the operation system to increase the efficiency of power management and the processing speed of the computer system.

According to the ACPI specification, the power management of the computer system is classified into six modes including S0 (a normal mode), S1~S4 (suspended modes) and S5 (a power off mode) from low to high. Each of these different suspended modes S1~S4 allows for different level of power saving and usage. A computer system in the S1 mode simply shuts down the hard drives and the monitor, but leaves everything else running normally. S2 mode offers slightly greater power saving than the S1 mode. A computer system in the S2 mode not only shuts down the monitor and hard drives, but also interrupts power to be supplied to the CPU and its cache. A computer system in the S3 mode shuts down almost everything except for the RAM and the power management controller. The S3 mode is also referred as a "suspend to RAM" mode to listen for a wake-up action. When the computer system comes into the S3 mode, the ACPI allows the RAM to store the last operation of the computer system. When the computer system is turned back on from the S3 mode, the computer system is quickly restored to the last operation based on the data stored in the RAM without normal booting. S4 mode is known as a hibernation mode in which the entire computer system is stopped and all of the system modes and contexts are stored to disk selected by the BIOS. The S4 mode is also referred as a "suspend to disk" mode.

On the other hand, the computer system principally comprises a host computer, a monitor and other peripheral devices. The monitor may be a cathode array tube (CRT) monitor or a liquid crystal display (LCD). Recently, the LCD monitors are becoming popular. The host computer transmits video signals to the monitor via signal lines. The peripheral devices are also electrically connected to the host computer. Generally, the host computer and the monitor are distant from each other. For example, the monitor is placed on a table, whereas the host computer is placed under the table. As such, when the host computer is to be started, the user needs to bend down to press the power button, which is not user-friendly. The common human-machine interfaces for the computer system include the monitor, the mouse, the keyboard, and the front panel of the host computer (which is used to turn on/off the host computer, draw out/insert disks or swap IEEE 1394 interface and USB devices, etc). However, among these the human-machine interfaces, the monitor, the mouse and the keyboard are frequently manipulated by a computer user when a computer system is used.

U.S. Patent Application Publication 2003/0107566, which is published in Jun. 12, 2003, describes the use of an external USB device such as a keyboard or a mouse to control the turning on/off state of the host computer. This technology provides a monitor having a USB hub in connection with external USB devices. In addition, a digital video interactive (DVI) cable is employed to connect the monitor with the power output port, the graphic card and the USB port of the host computer so as to transmit video signals from the host computer to the monitor for display. In the S3 mode of the power management system of the host computer, by operating the input/output device, for example, a USB keyboard or a mouse connected to the USB hub of the monitor, a USB controller inside the monitor will transmit a wake-up signal to the host computer via the USB cable to wake up the host computer from the power saving mode to the normal mode.

According to the above technology, the host computer can be woken up by employing a keyboard or a mouse. However, the external device should be connected to a monitor having a USB hub. Since the ordinary LCD monitor has no USB hub to connect the external USB device, this LCD monitor should be specifically designed. For example, an internal USB hub is provided in the LCD monitor as a connection medium of the external device. The fabrication cost of this LCD monitor having an internal USB hub is relatively high. After a triggering signal is asserted from the external device, the USB controller in the monitor will transmit a wake-up signal to the host computer to wake up the host computer from the suspended mode when the USB controller detects an input signal from the input/output device via the USB hub. However, such means of waking up the host computer by signal transmissions from the USB device to the LCD monitor and then from the LCD monitor to the host computer is inefficient. Furthermore, two power supply apparatuses are required by the LCD monitor to generate driving power for the USB controller and the USB hub, which is not cost effective.

SUMMARY OF THE INVENTION

It is an object of the present invention to provide a monitor and a method for controlling power-on and power-off of a host computer so as to reduce fabricating cost and increase efficiency of signal transmission.

In accordance with a first aspect of the present invention, there is provided a monitor for controlling power-on and power-off of a host computer. The host computer has a processing device. The monitor comprises a switch device, a monitoring device and a transmission device. The switch device is used for changing a status thereof in response to an external force applied thereto. The monitoring device is electrically connected to the switch device for monitoring a change of the status of the switch device, and determines if a power management event is activated by the change of the status of the switch device. The transmission device is electrically connected to the monitoring device, and transmits a power management signal to the host computer according to the determination that the change of the status of the switch status activates a power management event, such that the processing device performs a power-on or a power-off operation on the host computer.

In accordance with a second aspect of the present invention, there is provided a computer system. The computer system comprises a host computer and a monitor. The host computer has a processing device. The monitor comprises a switch device, a monitoring device and a transmission device. The switch device is used for changing a status thereof in response to an external force applied thereto. The monitoring device is electrically connected to the switch device for monitoring a change of the status of the switch device, and determines if a power management event is activated by the change of the status of the switch device. The transmission device is electrically connected to the monitoring device, and transmits a power management signal to the host computer according to the determination that the change of the status of the switch device activates a power management event, such that the processing device performs a power-on or a power-off operation on the host computer.

In accordance with a third aspect of the present invention, there is provided a method for controlling power-on and power-off of a host computer. Firstly, a monitor having a switch device is provided. Then, a status of the switch device is changed in response to an external force applied thereto. Then, if the status of the switch device is changed by means of successively pressing the switch device twice, a power management event is activated and detected accordingly. Afterward, a power management signal is transmitted to the host computer according to the determination that the change of the status of the switch device activates a power management event, so as to perform a power-on or a power-off operation on the host computer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
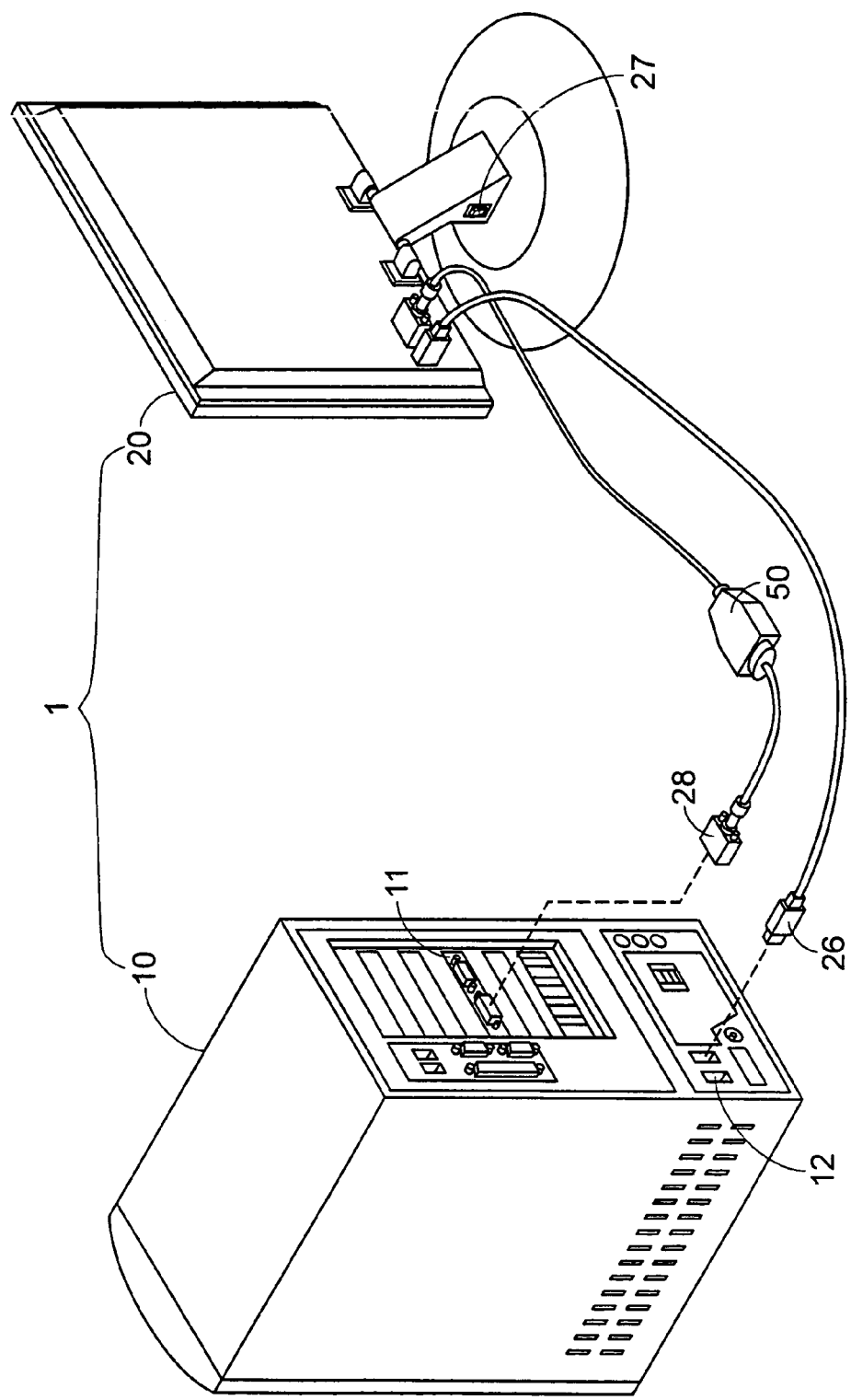
FIG. 1 is a perspective view of a computer system according to an embodiment of the present invention.

Referring to FIG. 1, a computer system according to an embodiment of the present invention is shown. The computer system 1 comprises a host computer 10 and a LCD monitor 20. The host computer 10 comprises a plurality of hardware components such as a graphic card 11. The LCD monitor 20 comprises a switch device 27 such as a multi-stage electronic/mechanic switch. A digital video interactive (DVI) cable 50 and a USB cable are employed to connect the LCD monitor 20 and the host computer 10, respectively. The DVI cable 50 comprises a video connector 28 connected to the graphic card 11 of the host computer 1, and the USB cable comprises a USB connector 26 connected to a USB port 12 of the host computer 1.

Figure 2:
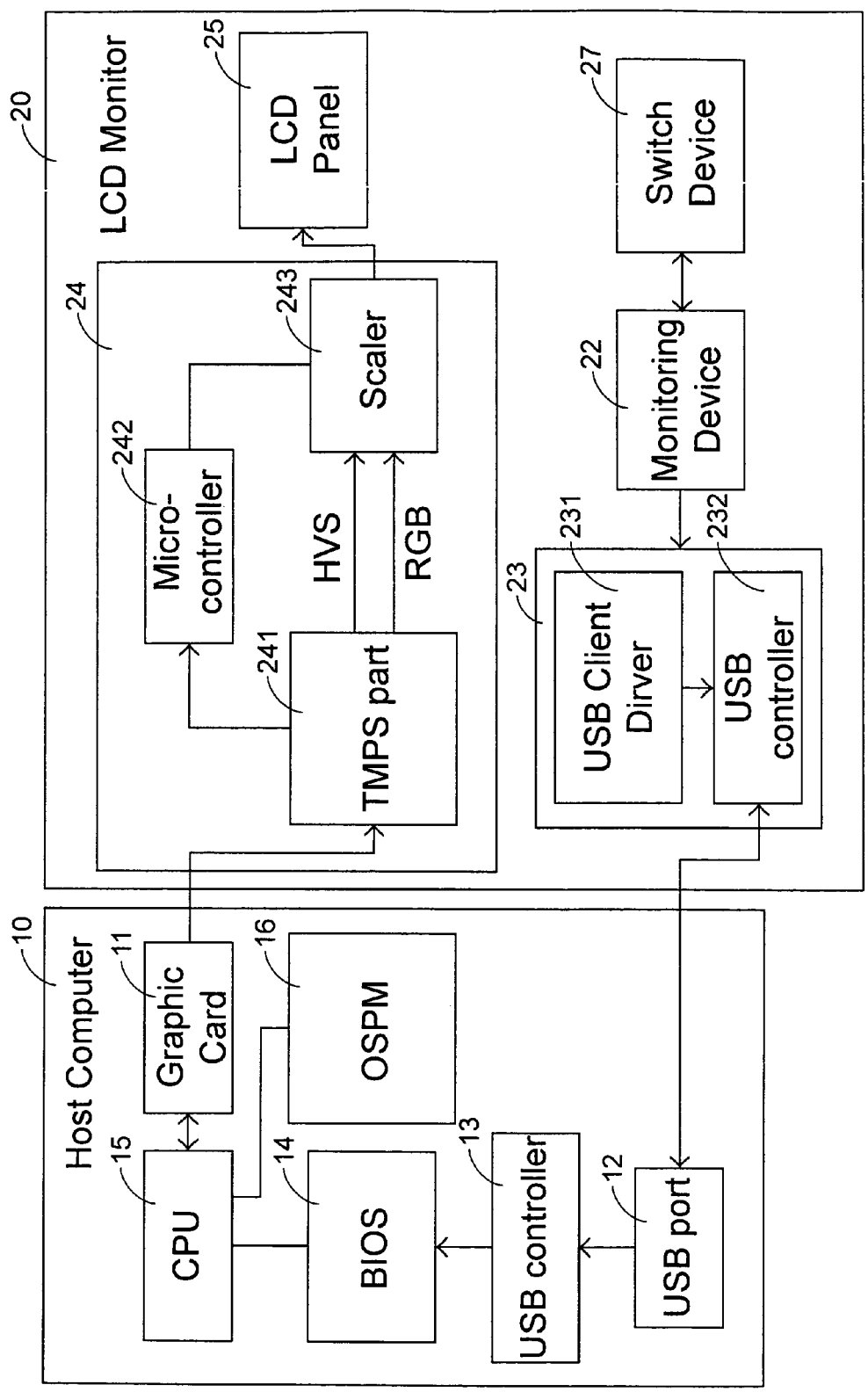
FIG. 2 is a block diagram illustrating the connection of the LCD monitor and the host computer.

Referring to FIG. 2, a block diagram illustrating the connection of the LCD monitor and the host computer is shown. The LCD monitor 20 comprises a switch device 27, a monitoring device 22, a transmission device 23, a control chip module 24 and a LCD panel 25. The host computer 10 comprises a graphic card 11, a USB port 12, a USB controller 13, a basic input/output system (BIOS) 14, a central processing unit (CPU) 15 and an operating system directed power management (OSPM) 16.

If the switch device 27 is successively pressed twice, a power management event is generated in response to the change of the status of the switch device 27. According to the change of the status of the switch device 27, the monitoring device 22 determines if a power management event is activated. If the power management event is associated with the power management of the host computer 10, the transmission device 23 will transmit a power management signal to the host computer 10.

The transmission device 23 comprises a USB client driver 231 and a USB controller 232. When the power management event is activated, the USB client driver 231 will be downloaded into the USB controller 232 to drive the USB controller 232. As such, the USB controller 232 and host computer 10 can communicate signals with each other. Furthermore, the LCD monitor 20 can not only receive but also transmit signals. Via the USB connector 26 as shown in FIG. 1, the power management signal is transmitted from the LCD monitor 20 to the USB port 12 of the host computer 10 accordingly.

The control chip module 24 comprises a transition minimized differential signaling (TMDS) part 241, a micro-controller 242 and a scaler 243. In the LCD monitor 20, a compressed digital video signal is transmitted from the host computer 10 to the TMDS part 241 via the DVI cable 50. Then, the TMDS part 241 decompresses the transmitted digital video signal, and transmits horizontal/vertical synchronous signals HVS to the micro-controller 242 and the scaler 243, and transmits RGB signals to the scaler 243. Thereafter, the micro controller 242 determines the resolution of the LCD panel 24 on the basis of the horizontal/vertical synchronous signal HVS, and transmits a control signal to the scaler 243, thereby adjusting the RGB signals according to the determined resolution. The adjusted RGB signals are then transmitted to the LCD panel 25 for display.

The method for controlling power of the host computer by using the LCD monitor of the present invention will be described in more detail as follows.

After the power management signal is received from the USB port 12, the USB controller 13 of the host computer 10 transmits this power management signal to the BIOS 14. In response to the power management signal, the BIOS 14 performs a power-on or a power-off operation associated with the host computer 10.

The ACPI specification defines six power modes from low to high, i.e. S0 (a working mode), S1~S4 (suspended modes), and S5 (a power off mode). Each of these different suspended modes S1~S4 allows for different level of power saving and usage. In this embodiment, the power modes used therein are similar to those described in the background of the invention, and are not to be redundantly described herein. In addition, the power management signal can be a wake-up signal or a sleeping signal.

Please refer to FIG. 2, again. When the host computer 10 is in any one of the modes S1~S5 and the LCD monitor 20 is in a standby mode, if the switch device 27 of the LCD monitor 20 is successively pressed twice, a wake-up signal will be transmitted to the host computer 10 via the USB connection between the LCD monitor 20 and the host computer 10. After the wake-up signal is received by the USB controller 13, the BIOS 14 will enable the CPU 15 to execute a power-on operation for the host computer 10. That is, the host computer 10 returns to a working mode. During the startup operation, the LCD monitor 20 also returns from the power saving modes to the working mode in response to the wake-up signal transmitted from the host computer 10.

When the host computer 10 and the LCD monitor 20 are both operated in the working mode, if the switch device 27 of the LCD monitor 20 is pressed once, the LCD monitor 20 will be turned off. If the switch device 27 of the LCD monitor 20 is successively pressed twice, a sleeping signal will be transmitted to the host computer 10 via the USB connection between the LCD monitor 20 and the host computer 10. After the sleeping signal is received by the USB controller 13, the BIOS 14 will determine which one of the power saving modes S1~S5 is to be entered and allow a corresponding component to execute the sleeping procedures. The sleeping procedures can be performed as follows. For example, when any one of the S1~S3 power modes is to be entered, the sleeping procedure is performed by the BIOS 14. When the S4 power mode is to be entered, the sleeping procedure is performed by the BIOS 14 or the OSPM 16 as required. However, when the S5 power mode is to be entered, the sleeping procedure is performed by the BIOS 14. After the host computer 10 enters the suspend mode, the LCD monitor 20 will enter the power saving mode.

Figure 3:
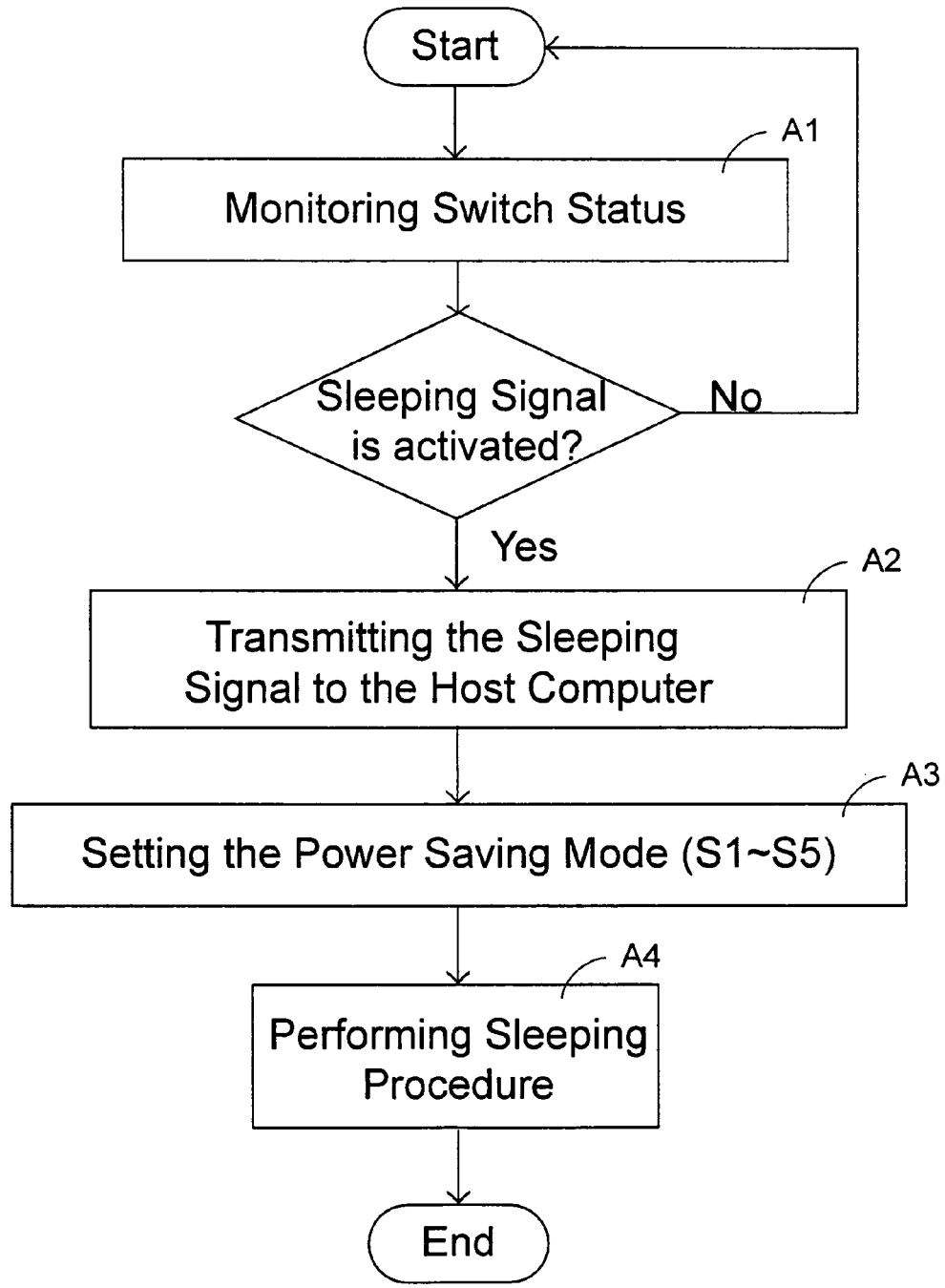
FIG. 3 is a flowchart illustrating a method for controlling the power-off of the host computer by proceeding to the sleeping procedure.

Referring to FIG. 3, a flowchart illustrating a method for controlling power-off of the host computer by proceeding to the sleeping procedure is shown. Firstly, the change of the status of the switch device 27 is monitored by the monitoring device 22 (step A1). Then, the switch device 27 is successively pressed twice to change the status of the switch device 27. According to the change of the status of the switch device 27, the monitoring device 22 determines if a sleeping signal is activated. If a sleeping signal is activated, it will be transmitted to the host computer 10 (step A2). According to the contents carried by the sleeping signal, the host computer 10 is operating in one of the suspended modes S1~S5 (step A3). According to the determined suspended mode, the host computer 10 executes the corresponding sleeping procedure (step A4).

Figure 4:
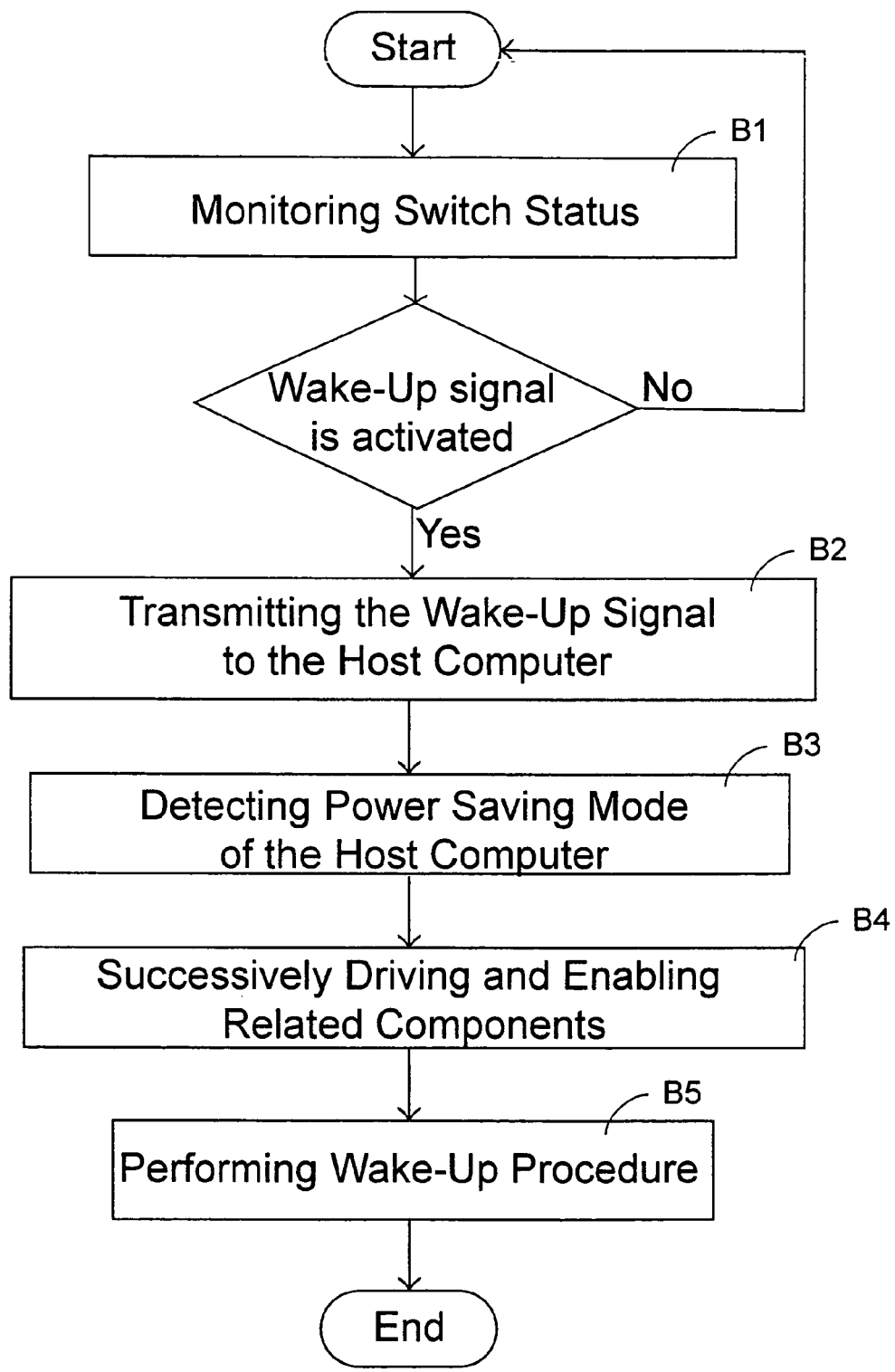
FIG. 4 is a flowchart illustrating a method for controlling the power-on of the host computer by proceeding to the wake-up procedure.

Referring to FIG. 4, a flowchart illustrating a method for controlling power-on of the host computer by proceeding to the wake-up procedure is shown. Firstly, the switching status of the switch device 27 is monitored by the monitoring device 22 (step B1). Then, the switch device 27 is successively pressed twice to change the switching status. According to the change of the status of the switch status, the monitoring device 22 determines if a wake-up signal is activated. If a wake-up signal is activated, it will be transmitted to the host computer 10 (step B2). In response to the wake-up signal, it is determined which one of the power saving modes S1~S5 is the host computer 10 (B3). According to the power saving mode, the related components are subsequently driven and enabled (step B4). Then, the wake-up procedure is performed such that the host computer 10 is operated in the normal mode (step B5).

From the above description, the monitor and the method of controlling power-on and power-off of a host computer by such monitor according to the present invention are capable of effectively controlling the power of the host computer. In addition, for enhancing user's convenience, the power management modes are controlled by activating the switch device. Since the LCD monitor does not require the USB hub according to the present invention, the fabrication cost is effectively reduced. Moreover, the power management signals can be directly transmitted to the host computer via USB connection so as to provide an efficient signal transmission.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A monitor for controlling power of a host computer having a processing device, said monitor comprising:
   a switch device for changing a status thereof in response to an external force applied thereto;
   a monitoring device electrically connected to said switch device for monitoring a change of said status of said switch device, and determining if a power management event is activated by the change of said status of said switch device; and
   a transmission device electrically connected to said monitoring device, and transmitting a power management signal to said host computer according to a determination that said change of said status of said switch device activates a power management event, such that said processing device performs a power-on or a power-off operation on said host computer;
   wherein said transmission device comprises a first USB controller for receiving said power management signal and a USB client driver for being downloaded into said first USB controller when said power management signal is received by said first USB controller, and driving said first USB controller to transmit said power management signal to said host computer.

2. The monitor according to claim 1 wherein said switch device is a multistage electronic/mechanic switch.

3. The monitor according to claim 1 wherein said status of said switch device is changed by successively pressing said switch device twice with said external force so as to activate said power management event.

4. The monitor according to claim 1 wherein said monitor is electrically connected to a graphic card and a USB port of said host computer via a digital video interactive (DVI) cable and a USB cable, respectively.

5. The monitor according to claim 4 wherein said host computer comprises a second USB controller electrically connected to said USB port to transmit said power management signal to said processing device.

6. The monitor according to claim 5 wherein said processing device is a basic input/output system (BIOS) being electrically connected to said second USB controller.

7. The monitor according to claim 1 wherein said host computer comprises a power management system complying with an Advanced Configuration and Power Management Interface (ACPI) specification.

8. The monitor according to claim 1 wherein said monitor is a LCD monitor.

9. The monitor according to claim 8 further comprising:
   a control chip module electrically connected to said host computer for receiving a video signal from said host computer and processing said video signal; and
   a LCD panel electrically connected to said control chip module and receiving a processed video signal from said control chip module for display.

10. A method for controlling power of a host computer, said method comprising steps of:
  providing a monitor having a switch device;
  changing a status of said switch device in response to an external force applied thereto;
  monitoring a change of said status of said switch device, and determining if a power management event is activated by said change of said status of said switch device;
  transmitting a power management signal to said host computer according to a determination that said change of said status of said switch device activates a power management event, so as to perform a power-on or a power-off operation on said host computer;
  receiving said power management signal from a first USB controller inside said monitor; and
  downloading a USB client driver into said first USB controller to transmit said power management signal to said host computer.

11. The method according to claim 10 wherein said switch device is a multistage electronic/mechanic switch.

12. The method according to claim 10 wherein said status of said switch device is changed by successively pressing said switch device twice with said external force so as to activate the power management event.

13. The method according to claim 10 wherein said monitor is electrically connected to a graphic card and a USB port of said host computer via a digital video interactive (DVI) cable and a USB cable, respectively.

14. The method according to claim 13 wherein said host computer comprises a second USB controller electrically connected to said USB port to transmit said power management signal to said processing device.

15. The method according to claim 14 wherein said processing device is a basic input/output system (BIOS) electrically connected to said second USB controller.

16. The method according to claim 10 wherein said host computer comprises a power management system complying with an Advanced Configuration and Power Management Interface (ACPI) specification.

17. The method according to claim 10 wherein said monitor is a LCD monitor.

* * * * *